United States Patent
Boertjes et al.

(10) Patent No.: US 9,755,776 B2
(45) Date of Patent: Sep. 5, 2017

(54) TRANSIENT AND SWITCHING EVENT STABILIZATION OF FIBER OPTIC TRANSPORT SYSTEMS

(71) Applicant: Ciena Corporation, Hanover, MD (US)

(72) Inventors: David Boertjes, Ottawa (CA); Loren Berg, Richmond (CA)

(73) Assignee: Ciena Corporation, Hanover, MD (US)

( * ) Notice: Subject to any disclaimer, the term of this patent is extended or adjusted under 35 U.S.C. 154(b) by 36 days.

(21) Appl. No.: 14/635,565

(22) Filed: Mar. 2, 2015

(65) Prior Publication Data
US 2015/0171987 A1    Jun. 18, 2015

Related U.S. Application Data

(63) Continuation of application No. 13/224,549, filed on Sep. 2, 2011, now Pat. No. 8,971,705.

(51) Int. Cl.
| | |
|---|---|
| H04B 10/08 | (2006.01) |
| H04J 14/02 | (2006.01) |
| H04B 10/077 | (2013.01) |
| H04B 10/079 | (2013.01) |
| H04J 14/06 | (2006.01) |

(52) U.S. Cl.
CPC ...... *H04J 14/0221* (2013.01); *H04B 10/0775* (2013.01); *H04B 10/07955* (2013.01); *H04J 14/021* (2013.01); *H04J 14/0276* (2013.01); *H04J 14/06* (2013.01)

(58) Field of Classification Search
None
See application file for complete search history.

(56) References Cited

U.S. PATENT DOCUMENTS

| | | | | | |
|---|---|---|---|---|---|
| 6,134,033 | A | * | 10/2000 | Bergano | H04B 10/2507 398/1 |
| 6,195,200 | B1 | * | 2/2001 | DeMarco | H01S 3/06795 359/333 |
| 6,961,522 | B1 | * | 11/2005 | Castagnetti | H04B 10/2916 398/157 |
| 2007/0086779 | A1 | * | 4/2007 | Stephens | H04B 10/0775 398/33 |
| 2013/0022355 | A1 | * | 1/2013 | Charlet | H04J 14/0204 398/48 |

\* cited by examiner

*Primary Examiner* — Ken N Vanderpuye
*Assistant Examiner* — David Lambert
(74) *Attorney, Agent, or Firm* — Clements Bernard Walker PLLC; Christopher L. Bernard; Lawrence A. Baratta, Jr.

(57) ABSTRACT

A method and system for transient and switching stabilization of a fiber optic transport system. One or more data-bearing channels are coupled to an optical fiber. The data-bearing channels are distributed among a plurality of frequency sub-bands. A set of control channels is also coupled to the optical fiber. Each control channel includes a pair of signals at separate frequencies. There is at least one control channel in each of the plurality of frequency sub-bands. The pair of signals of a control channel are cross-polarized. Optical power in at least one of the plurality of sub-bands is measured. Responsive to the measured optical power, the optical power of a control channel is adjusted to maintain a substantially constant power of a sub-band that contains the adjusted control channel.

20 Claims, 5 Drawing Sheets

TRANSIENT AND SWITCHING EVENT STABILIZATION OF FIBER OPTIC TRANSPORT SYSTEMS

CROSS-REFERENCE TO RELATED APPLICATION

The present application for patent claims the benefit of U.S. Pat. No. 8,971,705, entitled "TRANSIENT AND SWITCHING EVENT STABILIZATION OF FIBER OPTIC TRANSPORT SYSTEMS," issued on Mar. 3, 2015, assigned to the assignee hereof, and expressly incorporated herein by reference in its entirety.

FIELD OF THE INVENTION

The present invention relates to optical communications, and in particular to a method and system for stabilizing transient events on a fiber optic transport system.

BACKGROUND OF THE INVENTION

Today's fiber optic transport systems are evolving in many ways. They are achieving longer transmission distances between electrical regeneration points through the introduction of coherent detection and digital signal processing (DSP) technologies. Today's systems have evolved from point-to-point systems to optical mesh deployments through the introduction of reconfigurable optical add drop multiplexer (ROADM) technologies. These changes were first applied to terrestrial transmission systems. Recently, these technologies have been introduced into submarine systems which have traditionally required specific transponder technologies because of the long distances between electrical regeneration points.

These changes present opportunities and challenges. The opportunity is to use the flexibility of the ROADM and the DSP to allow the path of the signal to be switched in the optical domain. The challenge is to maintain post forward error correction (FEC) error-free performance for all other signals in the transmission system while making these changes.

A photonic line system is a concatenation of optical amplifiers. For example, these may be a combination of Raman Amplifiers and Erbium Doped Fiber Amplifiers (EDFAs). The performance of channels transmitted through the line system is optimal when the powers of the channels are controlled to balance noise and non-linear effects in the fiber. The effect of noise added by the optical amplifiers is minimized by increasing the power of the channels. However, deleterious non-linear effects are stronger at higher optical powers. Therefore, there is an optimal power level for any individual channel. To complicate this further, there may be an arbitrary number of these channels present in a dense wavelength division multiplexing (DWDM) transmission system. In addition, the gain shape and noise performance across wavelength of the amplifiers is affected by the spectral loading of the system, i.e., the population of other channels, the wavelengths they occupy, and their optical powers. Since channels in an active system may be added or dropped for a variety of reasons, the gain shape and noise performance changes in an unpredictable manner. Non-linear effects are also affected by the spectral loading in the fiber through interactions between these channels, for example cross-phase modulation (XPM) which is dependent on the relative powers and difference in wavelength between interfering channels.

While the addition or deletion of channels from a line system can be simulated, simulation involves a calculation which is time-consuming and costly to perform within a network element. The simulation is also sensitive to unknown parameters which are difficult to obtain, such as the connector losses which may exist before the input or at the output of the transmission fiber. It is difficult to differentiate this loss from the loss of the fiber itself, and these differences will change the solution which is obtained through simulation. Therefore, in the absence of simulation, the system cannot predict the final state of the channels which will result from any change.

Alternatively, the optimization of a line system can be achieved using a control system which measures a combination of total powers and per-channel powers at various points. Such a controller can be implemented which can iterate to a solution which was not easily calculated by the system and such a solution will intrinsically include the effect of unknown parameters described in the previous paragraph. A second advantage of this approach is that it will converge even if the calculation of the solution is unknown or inaccurate.

A feedback control loop, e.g. a proportional integral derivative (PID) controller, can be used to optimize the set of channels which may be present at a given time. A typical PID controller may use optical signal to noise ratio (OSNR) as a metric to optimize the channels while implementing an upper power limit for the channels which is known to limit the non-linear effects to a manageable level.

A problem with this approach is its sensitivity to perturbations which are a natural consequence of channel additions and deletions. Because the line system is essentially non-linear (a perturbation in one channel's power affects other channels), the controller must be limited to small changes to remain stable and converge. Since the controller is iterative, each of these changes must be allowed to converge appropriately before applying another change. The result is that the request to add or delete channels takes time. Although this time can be reduced, there will still be delays when reconfiguring services.

A second problem with this approach is its sensitivity to perturbations which are not intended, but can be the result of failures of some part of the system. There are many such events which can happen, such as operator error causing a fiber disconnect, equipment failures causing changes in optical power, fiber cuts where a portion of the transmission fiber is damaged or broken, etc. When these events occur there can be a large change in the number of channels which are transmitted through a particular fiber because of channel adds and drops through ROADM nodes. Although the control system can accommodate this type of change, it will take time to converge to a new optimal condition. The performance of the remaining channels can be compromised during the time it takes for this action to complete.

Other solutions exist which try to keep the spectral power in the EDFAs representative of the full fill spectrum under all conditions. These approaches have worked in the past mainly because of the exclusive use of direct detection and non-polarization multiplexed signals which were the only optical receiving means available before the commercial introduction of coherent optical receivers. In the presence of these coherent signals, which have been widely adopted in product and by standards bodies, current solutions fail to provide the required system level performance for reasons which will be described in the following sections.

Therefore what is needed is a method and system for transient event stabilization of fiber optic transport systems.

SUMMARY OF THE INVENTION

The present invention advantageously provides a method and system for transient and switching stabilization of a fiber optic transport system. According to one aspect, the invention provides a method for power control of signals carried by an optical fiber. The method includes coupling one or more data-bearing channels to the optical fiber, where the data-bearing channels are distributed among a plurality of frequency sub-bands. A set of control channels is also coupled to the optical fiber. Each control channel includes a pair of signals at separate frequencies. There is at least one control channel in each of the plurality of frequency sub-bands. The signals of a control channel are cross-polarized. The optical power in at least one of the plurality of sub-bands is measured. Responsive to the measured optical power, the optical power of a control channel is adjusted to maintain a substantially constant power of a sub-band that contains the adjusted control channel.

According to another aspect, the invention provides an apparatus for power control of signals carried by an optical fiber. The apparatus includes a plurality of lasers producing a plurality of control channels. Each control channel includes a pair of signals at separate frequencies. Each control channel is in a separate one of a plurality of frequency sub-bands. A plurality of attenuators control attenuation of a corresponding control channel based on a plurality of corresponding feedback attenuation control signals. A plurality of detectors detect power in each of a plurality of corresponding optical signals received in the frequency sub-bands. A digital processor generates the plurality of feedback attenuation control signals based on the detected power. The feedback attenuation control signals are provided to a corresponding one of the plurality of attenuators.

According to yet another aspect, the invention provides an optical control channel signal generator. The optical control channel signal generator includes a plurality of lasers producing a plurality of signal pairs. Each signal pair forms a control channel in a corresponding separate one of a plurality of sub-bands. The signals of each signal pair are separated by a first frequency interval. A combiner combines a first signal and a second signal of a signal pair so that a polarization of the first signal is orthogonal to a polarization of the second signal. The optical control channel signal generator also includes a plurality of attenuators, each attenuator attenuates a corresponding signal pair based on a measured optical power of a corresponding sub-band.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
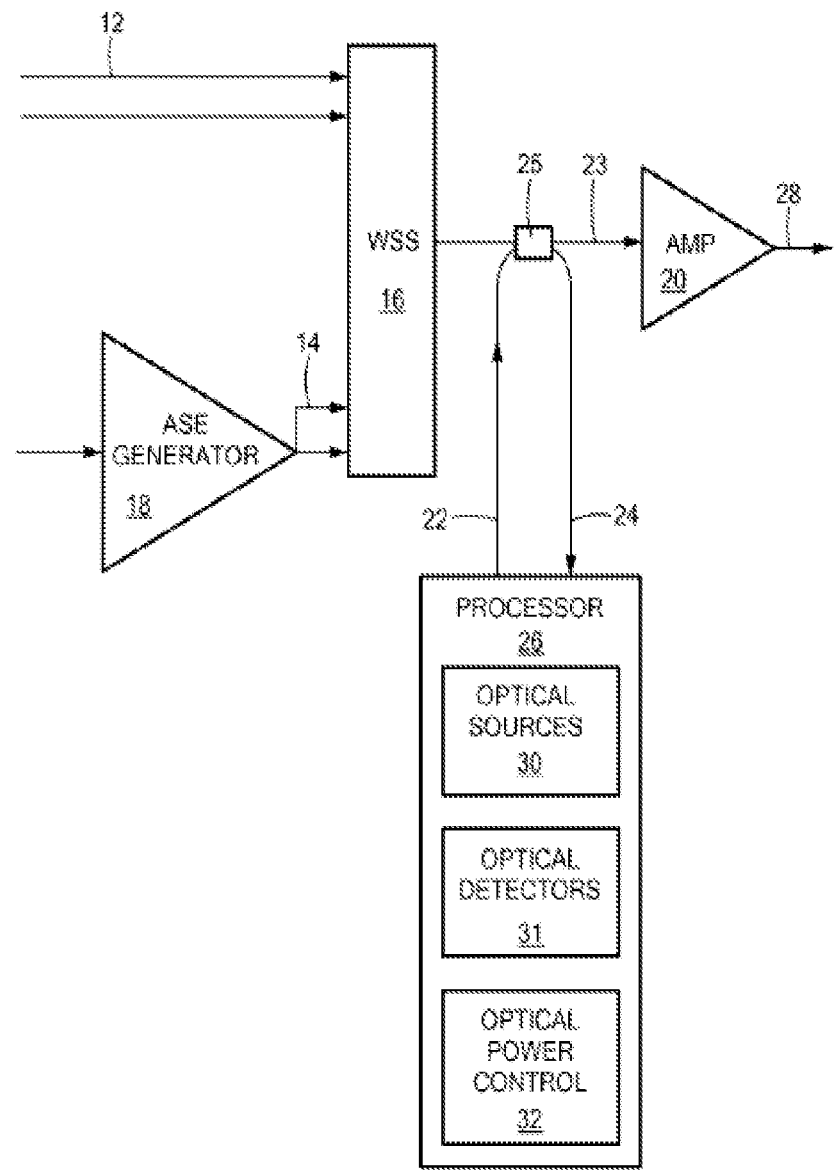
FIG. 1 is a block diagram of an exemplary system for transient and switching stabilization of a fiber optic transport system constructed in accordance with the principles of the present invention.

Before describing in detail exemplary embodiments that are in accordance with the present invention, it is noted that the embodiments reside primarily in combinations of apparatus components and processing steps related to implementing a system and method for transient event stabilization of fiber optic transport systems. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One approach to stabilization of a fiber optic transport system to account for transient phenomena occurring with the addition or deletion of channels is to introduce 'dummy' channels. With the introduction of dummy channels, the amplifier chain of the fiber optic transport system behaves as if it has a full complement of channels. The power of the dummy channels may be specified at start up of the system. The dummy channels may be generated by using a broadband amplified spontaneous emission (ASE) source. The output of the ASE source may be filtered by a wavelength selective switch (WSS). An alternative implementation may employ a wavelength-independent tap between the WSS and an output amplifier and using a 1×1 WSS to comb and control the powers of the dummy channels.

Using an ASE source rather than using individual lasers offers several advantages. First, lasers tend to be of a single polarization, allowing for accidental alignment through coupling or polarization mode dispersion (PMD) in the transmission fiber and optical elements. This results in an aggregate signal with a high degree of polarization (DOP). A high aggregate DOP is undesirable because it can induce penalties arising from polarization-dependent effects such as stimulated Raman scattering (SRS) in the fiber. Another adverse consequence of high DOP is polarization hole burning that results in polarization-dependent gain (PDG) in the Erbium Doped Fiber Amplifiers (EDFAs).

Second, the inherent noise of the laser sources can interact with the signal of the data-bearing channels, through non-linear interactions such as cross phase modulation (XPM), four wave mixing (FWM), cross gain modulation (XGM), cross polarization modulation (XpolM). To reduce these interactions would require use of lasers with a very low line width, which would increase the cost of introducing dummy channels.

The use of ASE dummy channels overcomes these limitations of using individual lasers. ASE is inherently depolarized, which yields a low DOP of the aggregate signal. ASE also exhibits a low spectral density which, when the total power in a channel pass band is the same as the power of a data-bearing channel, drives a lower non-linear interaction than if all channels were data-bearing. Therefore, ASE dummy channels are suitable for pre-loading a fiber optic transport system. A constraint on the use of ASE dummy channels, however, it that their power should be carefully controlled to ensure that the non-linear interactions with the data-bearing channels be held to a manageable level.

With the use of ASE dummy channels, channel addition and deletions can now be achieved through a substitution of the ASE channel for a data-bearing channel, or vice versa. The only perturbation the system will experience occurs during the switch time interval of the wavelength selective switch (WSS), which can be on the order of 50 milliseconds (ms). This switching perturbation can be limited by limiting the number of channels to be switched at the same time.

The introduction of dummy channels, therefore, solve some of the problems associated with the intentional adding or deleting of channels, but do not solve problems arising from failure conditions. In the event of a failure, a plurality of data-bearing channels may be suddenly dropped faster than the WSS can switch to add dummy channels in their place. Also, per channel control of the WSS is usually achieved by taking per channel measurements using an optical spectrum analyzer (OSP) or an optical channel monitor (OCM). These per channel measurements are unacceptably slow on the order of 100 ms for a full spectrum measurement.

An alternative to adding dummy channels in the event of a failure is to increase the power of the dummy channels to offset the drop in the optical power since this change can be made relatively rapidly. However, this approach presents several challenges to be considered. First, the dummy channels whose power is to be increased might not exist if, for example, the system is at full data-bearing channel capacity. Further, if the power of dummy channels is increased, so as to compensate for lost data-bearing channels, the noise of the ASE will be transferred to the data bearing channels through non-linear interactions, which is not desirable.

Instead of increasing the number or power of dummy channels in response to a failure or other cause of reduction of data-bearing channels, a minimal number of control channels can be set aside. These control channels are spaced throughout the transmission band so as to adequately represent the full-fill condition from the point of view of an amplifier and fiber. In particular, large changes in dynamic gain tilt (DGT), spectral hole burning (SHB) in the EDFAs and stimulated Raman scattering (SRS) are avoided. The spectrum is subdivided into bins (frequency sub-bands). Each frequency sub-band has dummy channels, data-bearing channels, and at least one control channel. The total power level of a bin is set to a level that represents the full complement of channels which may be contained in the bin including the control channels. As such, during a fault where channels appear or disappear, the power of the control channels can be decreased or increased respectively.

Referring now to the drawing figures, in which like reference designators denote like elements, there is shown in FIG. 1 an exemplary system for transient and switching stabilization of a fiber optic transport system generally designated as "10." A plurality of data-bearing channels on lines 12 are received by a wavelength selective switch (WSS) 16. Also received by WSS 16 are a plurality of dummy channels on lines 14 generated by one or more amplitude spontaneous emission sources (ASE) 18. Although only one ASE generator is shown in FIG. 1, in some embodiments, a plurality of ASE generators may be provided for reasons such as redundancy. The WSS 16 multiplexes the signals from the lines 12 and 14 onto a single optical fiber 23. The optical signal carried by the fiber 23 may be input to an amplifier 20 before being transmitted onto a optical transmission fiber 28. Note that the terms fiber, optical fiber and optical line are used interchangeably herein and refer to a fiber optic transmission line.

System 10 includes an optical line 22 that carries a control channel signal from a processor 26. The processor 26 includes a plurality of optical sources 30 for the control channels. In one embodiment, there is at least one control channel signal for each of a plurality of frequency sub-bands. The optical sources may be low line width lasers with a single polarization. A signal from any two of the optical sources 30 may be combined by a polarization beam combiner (not shown) to produce an optical control channel signal that is coupled to the line 22. The optical control channels on the optical line 22 are coupled to the optical fiber 23.

The optical line 24 receives optical power from the optical fiber 23 via a coupler 25. Optical line 24 carries a signal coupled from the fiber 23 to the processor 26. The signal on the line 24 may be coupled to optical detectors 31 to detect optical power of each sub-band. The power of each control channel is adjusted by an optical power control unit 32 based on the detected optical power of a corresponding frequency sub-band.

Figure 2:
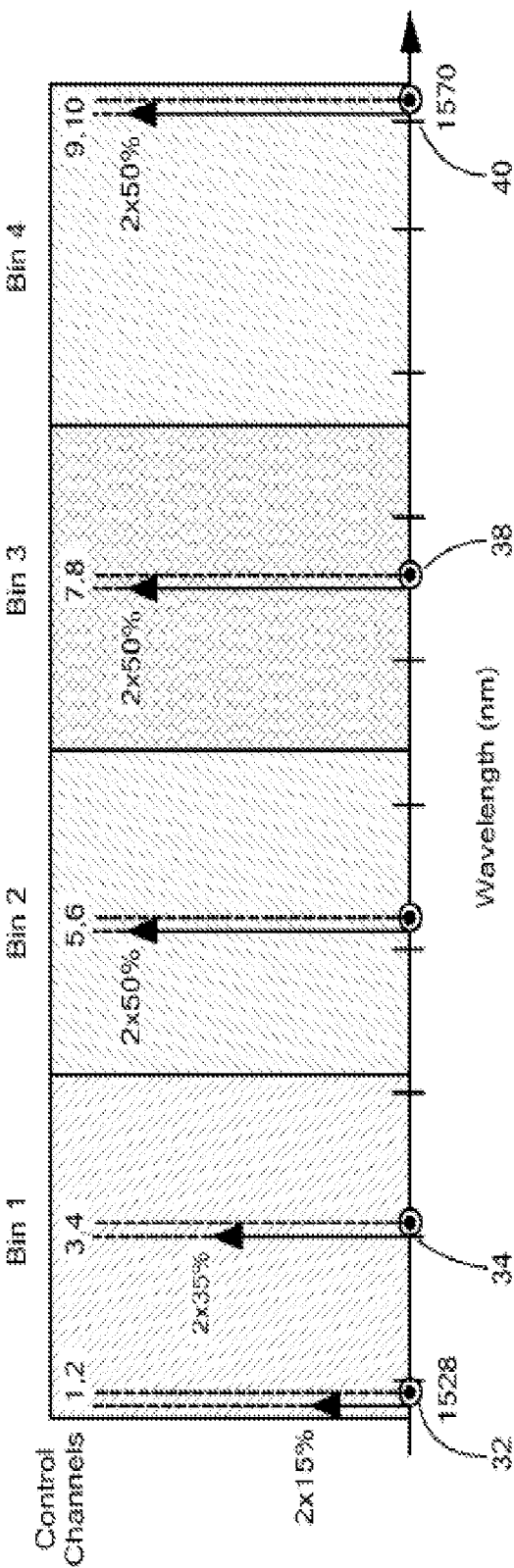
FIG. 2 is a diagram of an example of a spectrum containing control channels and separated into bins.

FIG. 2. is a diagram of an example of a spectrum containing control channels 32-40 and separated into bins (frequency sub-bands), e.g., bins 1, 2, 3 and 4. Bin 2, for example may have a total of 20 dummy and data-bearing channels and two control channel signal pairs 36 spaced closely together. During normal operation, all of the 20 dummy/data-bearing channels are present at a nominal per-channel power selected to achieve optimal transmission. The two control channels are also assigned the nominal per-channel power level. A total target power for the bin is set to the total power of all these channels. When a fault occurs, the power of the control channels is increased so that the total power of all channels of the bin is kept constant. When there is more than a single control channel in a bin, weighting factors can be adjusted and applied to each control channel. For example, in FIG. 2, the first control channel signals in bin number 1 are weighted by 30% (2×15%) and the second control channel signals are weighted by 70% (2×35%), Two low line width lasers with a low degree of polarization (DOP) are coupled using a polarization beam combiner to create a control channel, such that the light from the two sources are orthogonal to each other when coupled on to the fiber. Note that the polarization alignment of each control channel is independent of the polarization alignment of the other control channels.

The spacing of the pair of signals that make a control channel is selected to be just great enough to avoid a single polarization state of the control channel because a single polarization state would result in instability. The spacing of the signal pair is also selected to be small enough to reduce non-linear interactions between the signals of a control channel and the signals of the dummy/data-bearing channels nearby the control channel.

Figure 3:
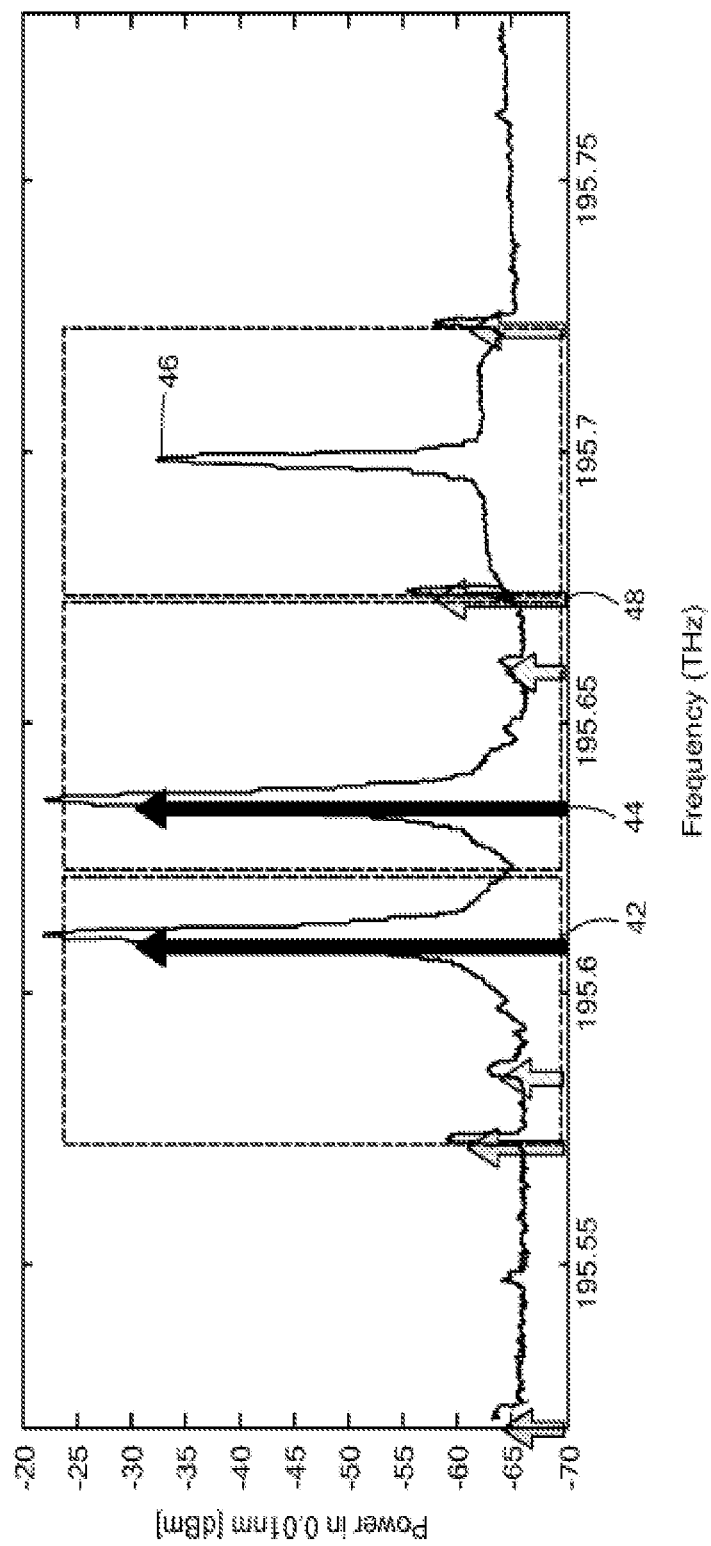
FIG. 3 is a diagram of an example showing the spacing of two control channels and dummy/data-bearing channels.

FIG. 3 is an example of the spacing of the signals 42 and 44 making up a control channel. Dummy/data-bearing channels 46 are spaced apart at regular frequency intervals of 50 Giga-Hertz (GHz). The control channel signal pair are offset from the regular spacing so that they are separated by one half a frequency interval that separates the dummy/data-bearing channels. Thus, for the example of FIG. 3, the control channel signal pairs are separated by 25 GHz. FIG. 3 also shows several four wave mixing (FWM) tones 48 that fall on the boundaries between channels, thereby minimizing their impact on system performance. In some embodiments, the FWM tones fall outside the bandwidth of a receiver of the data-bearing channels which may be adjacent to the control channels. Since the control channel powers may be much higher than the per-channel powers of the data-bearing channels, it is desirable to dither the control channel lasers to suppress stimulated Brillouin scattering (SBS). Note that the power of the control channels is close to the power of the data-bearing channels during normal operation. However, the power of the control channels is likely to be higher than the data-bearing channels when there are no dummy channels or under fault conditions where channels have been dropped.

A control scheme for adjusting the power of the control channels to timely react to a 100 microsecond transient can be realized using optical filters that are the same width as the bins. This embodiment can provide a fast total power measurement and feedback to control the power of the control channels in each bin. The power can be controlled by changing the current through the control channel lasers or by controlling a set of fast optical attenuators.

Referring again to FIG. 1, a coupling mechanism 25 couples the control channels to the fiber and receives optical feedback necessary to control the power of the control channels. The coupling mechanism may be a simple wavelength-independent coupler with an appropriately chosen tap ratio, for example (90% express channels)/(10% control channels). A second coupling mechanism taps off a portion of the light which includes light from the control channels so that the total power per frequency sub-band can be measured. This second coupler may have an appropriately selected tap ratio such as, for example, 95%/5%.

In an optical mesh deployment, there will be other line systems transmitting to and from other locations which may have their own set of control channels. An advantage of the coupling method described herein, is that the WSS is able to extinguish control channels from other sources before adding new control channels from a local source. In typical terrestrial applications, optical amplifiers are operated in gain control, whereas in typical submarine links, the amplifiers are operated in total output power control. When total output power control is used, a primary function of the control channels is to control the per-channel power of the dummy/data-bearing channels by saturating the total output power of the amplifiers in the line.

In some embodiments, the data-bearing channels are centered at regular frequency intervals. Each of a pair of signals forming a control channel are separated by one half of the frequency interval that separates adjacent data-bearing signals. The separation of the signals of a control channel signal pair may be selected to reduce four-wave mixing products on adjacent data-bearing channels. The signals forming the pair may have an average frequency that is at a midpoint of a frequency interval. Further, the separation of the pair of signals forming a control channel may be chosen to be greater than a bandwidth of a receiver of an adjacent data bearing channel.

Figure 4:
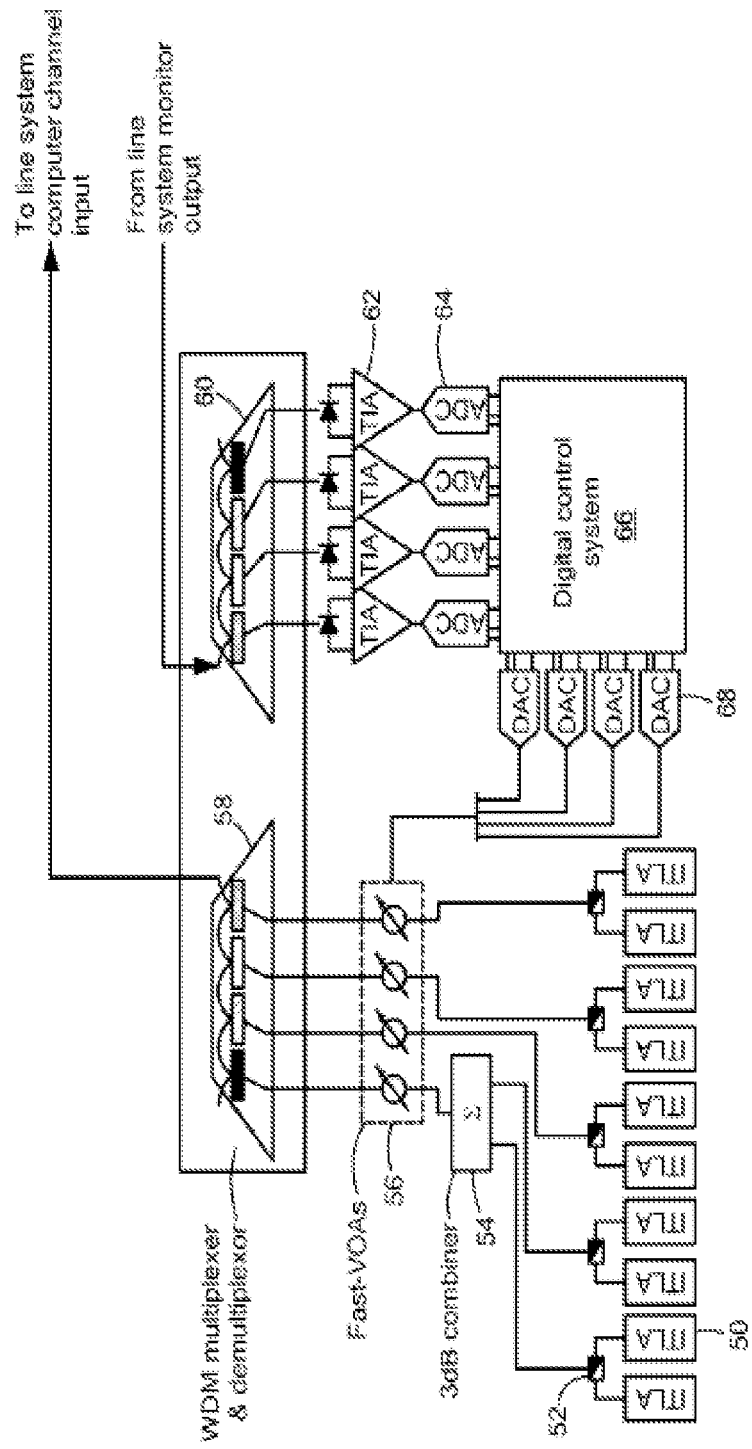
FIG. 4 is a block diagram of an exemplary channel controller for controlling the power of a plurality of control channels constructed in accordance with the principles of the present invention.

FIG. 4 is a block diagram of an exemplary channel controller 70 for controlling the power of a plurality of control channels. A plurality of low line width lasers 50 provide each of a pair of signals for a control channel. The signals are combined in a polarization beam splitter 52 to produce a control channel with two orthogonally polarized beams of narrow width. Two of the control channels are combined in a 3 dB combiner 54 to produce two control channels which can be controlled together within one frequency sub-band. Each control channel signal pair is fed to a fast Variable Optical Attenuator (VOA), 56 where the gain of the signal pair is adjusted based on power measurements of the control channels. The control channels are combined by a wavelength division multiplexer 58 which outputs the control channels to be input to a line system control channel input, coupling at least one control channel to each of a plurality of frequency sub-bands.

A line system monitor output couples the signals on the line system to a wavelength division demultiplexer 60 which separates the control channels along with any other channels within the respective frequency sub-band. The power of each control channel is detected by a trans-impedance amplifier (TIA) 62 and is coupled to an analog-to-digital converter 64. The detected signals are input to a digital control system 66 that implements processes to generate an attenuator control signal that is based on the power of a detected signal. The processes for generating an attenuator control signal may include a digital filter or recursive algorithm. The attenuator control signals are fed to digital-to-analog converters (DAC) 68. The DACs convert the attenuator control signals to analog signals that are used to control attenuation of the variable optical attenuators 56. Note that in some embodiments, the digital control system 66 may be replaced by analog circuitry that performs the same function.

Thus one embodiment is an apparatus for power control of signals carried by an optical fiber. The apparatus includes a plurality of lasers 50 to produce a plurality of control channels. Each control channel includes a pair of signals at separate frequencies. There is at least one control channel in each of a plurality of frequency sub-bands (as shown in FIG. 2). A plurality of attenuators 56 control attenuation of each control channel based on a plurality of feedback attenuation control signals. A plurality of detectors 62 detect power in each of a plurality of optical signals received in the frequency sub-bands. A digital processor 66 determines the plurality of feedback attenuation control signals based on the detected power. The feedback attenuation control signals are coupled to the plurality of attenuators 56 to control attenuation of each control channel.

Thus, one embodiment is an optical control channel signal generator having a plurality of lasers to produce a plurality of signal pairs. Each signal pair forms a control channel in a separate one of a plurality of frequency sub-bands. The signals of a signal pair forming a control channel are separated by a first frequency interval. A combiner combines a first signal and a second signal of a signal pair so that a polarization of the first signal is orthogonal to a polarization of the second signal. The combiner may include a polarization beam combiner. The optical control channel signal generator has a plurality of attenuators to attenuate a signal pair based on a measured optical power of a sub-band. The plurality of attenuators control the amplitudes of the signal pairs of the control channels. For example, the attenuators may control the amplitudes of the lasers producing the signals of the signal pair or may control the attenuation of a plurality of variable optical attenuators applied to the control channel signals. Adjustment of a control channel attenuator may occur within 1 to 100 microseconds of a change in optical power of a sub-band. Thus, compensation due to a break in the fiber or other fault that affects the power profile of the fiber may occur in less than 100 microseconds.

In some embodiments, a set of dummy channels are provided to substitute for data-bearing channels. The dummy channels have an optical power so as to maintain a substantially constant power profile on the optical fiber. A dummy channel may contain filtered optical noise from spontaneous emission from an optical amplifier.

Figure 5:
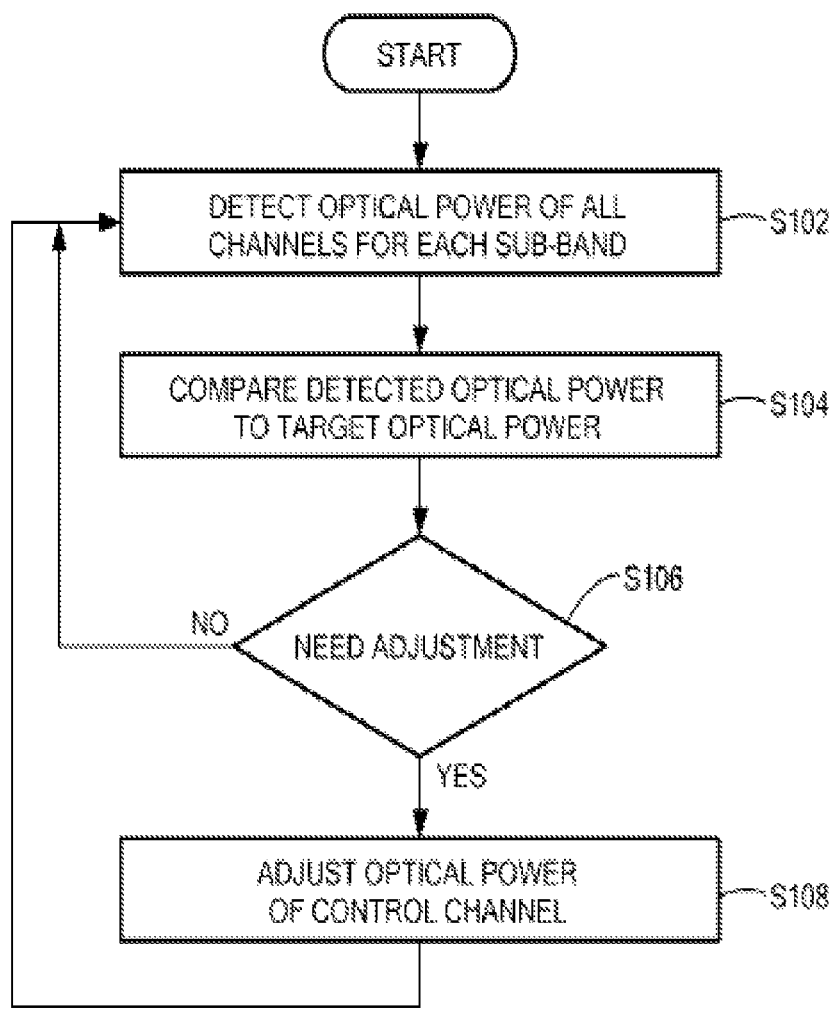
FIG. 5 is a flow chart of an exemplary process for adjusting power of a control channel.

FIG. 5 is a flow chart of an exemplary process for adjusting power of a control channel In a first step, the total optical power of all channels, data-bearing, dummy and control, for a sub-band is detected (step S102). The detected optical power is compared to a target optical power for the sub-band (step S104). Based on the comparison, a determination of whether the optical power of the control channel must be adjusted is made (step S106). If the optical power of the control channel should be adjusted, the adjustment is made to match the optical power to the target optical power (step S108). The process then continues at step S102. If the optical power of the control channels does not need adjustment, the process then continues at step S102, without adjusting the optical power of the control channel.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for power control of signals carried by an optical fiber, the method comprising:
    adding one or more data-bearing channels to the optical fiber, the data-bearing channels distributed among a plurality of frequency bins;
    adding a set of control channels to the optical fiber, each control channel comprising a pair of signals at separate frequencies, at least one control channel in each of the plurality of frequency bins, each signal of a pair being cross-polarized with respect to the other signal of the pair,
    adding a set of dummy channels to the optical fiber, at least one dummy channel in each of the plurality of frequency bins with a corresponding at least one control channel, wherein the set of dummy channels are generated by one or more broadband amplitude spontaneous emission (ASE) sources;
    measuring an optical power in at least one of the plurality of frequency bins; and
    responsive to a change in the optical power in the at least one of the plurality of frequency bins based on associated dummy channels, adjusting an optical power of one or more control channels to maintain a substantially constant power of a frequency bin that contains the adjusted control channels to ensure that non-linear interactions are managed to accommodate the change in the optical power of the associated dummy channels.

2. The method of claim 1, wherein the pair of signals is generated by a pair of low line width lasers.

3. The method of claim 1, wherein the separate frequencies of the pair of signals are selected to reduce four-wave mixing products on adjacent data-bearing channels.

4. The method of claim 1, wherein each of the separate frequencies of the pair of signals of a control channel are selected so that a difference between the separate frequencies is greater than a bandwidth of a receiver of an adjacent data-bearing channel.

5. The method of claim 1, wherein the data bearing channels are centered at predetermined frequency intervals.

6. The method of claim 1, wherein the data-bearing channels are centered at regular frequency intervals and wherein each of the separate frequencies of the pair of signals of a control channel are selected so that a difference between the separate frequencies is substantially one half a frequency interval.

7. The method of claim 1, wherein an average frequency of the separate frequencies is at a midpoint of a frequency interval.

8. The method of claim 1, wherein adjustment of a control channel occurs within 1 microsecond to 100 microseconds of a change in optical power of the corresponding frequency bin.

9. An optical control channel signal generator, comprising:
    a plurality of broadband amplitude spontaneous emission (ASE) sources configured to produce a set of dummy channels;
    one or more optical sources configured to produce at least one signal pair, each signal pair forming a control channel in a corresponding frequency bin with a corresponding dummy channel, the signals of each signal pair separated by a first frequency interval;
    a combiner configured to combine a first signal and a second signal of a signal pair, wherein a polarization of the first signal is orthogonal to a polarization of the second signal at the output of the combiner; and
    at least one attenuator each configured to attenuate a corresponding signal pair based on a measured optical power of a corresponding frequency bin and responsive to a change in the measured optical power in the corresponding frequency bin based on associated dummy channels to ensure that non-linear interactions are managed to accommodate the change in the measured optical power of the associated dummy channels.

10. The optical control channel signal generator of claim 9, wherein the combiner includes a polarization beam splitter.

11. The optical control channel signal generator of claim 10, wherein the at least one attenuator controls amplitudes of corresponding ones of the plurality of ASE sources.

12. The optical control channel signal generator of claim 11, wherein the at least one attenuator is a variable optical attenuator.

13. The optical control channel signal generator of claim 12, further comprising:
    a plurality of detectors, the plurality of detectors configured to detect power in each of a plurality of optical signals to be transmitted in the corresponding frequency bin; and
    a control circuit, the control circuit configured to measure the optical power of the corresponding frequency bin and to provide the measured optical power to the at least one attenuator.

14. The optical control channel signal generator of claim 13, wherein the control circuit is an analog circuit.

15. The optical control channel signal generator of claim 13, wherein the control circuit is a digital processor.

16. The optical control channel signal generator of claim 13, wherein each signal pair is separated by substantially one half of a frequency interval that separates adjacent data-bearing signals carried by an optical fiber that carries the control channel.

17. The optical control channel signal generator of claim 16, wherein an average frequency of each signal pair is substantially at a midpoint of a frequency interval.

18. A device for power control of signals carried by an optical fiber, comprising:
- a wavelength selective switch (WSS) adapted to add one or more data-bearing channels to the optical fiber, the data-bearing channels distributed among a plurality of frequency bins;
- a processor adapted to add a set of control channels to the optical fiber, each control channel comprising a pair of signals at separate frequencies, at least one control channel in each of the plurality of frequency bins, and the processor further adds a set of dummy channels to the optical fiber, at least one dummy channel in each of the plurality of frequency bins with a corresponding at least one control channel;
- optical detectors adapted to measure an optical power in at least one of the plurality of frequency bins; and
- optical power control adapted to adjust an optical power of one or more control channels responsive to a change in the optical power in the at least one of the plurality of frequency bins based on associated dummy channels to maintain a substantially constant power of a frequency bin that contains the adjusted control channels to ensure that non-linear interactions are managed to accommodate the change in the optical power of the associated dummy channels.

19. The device of claim 18, wherein the separate frequencies of the pair of signals are selected to reduce four-wave mixing products on adjacent data-bearing channels.

20. The device of claim 19, wherein each of the separate frequencies of the pair of signals of a control channel are selected so that a difference between the separate frequencies is greater than a bandwidth of a receiver of an adjacent data-bearing channel.

* * * * *